(12) United States Patent
Itagaki et al.

(10) Patent No.: US 9,003,819 B2
(45) Date of Patent: Apr. 14, 2015

(54) HEAT PUMP APPARATUS USING SUPERCOOLING DEGREE TO CONTROL EXPANSION VALVE

(75) Inventors: Atsushi Itagaki, Kawasaki (JP); Takashi Sugiyama, Kawasaki (JP); Toshiyuki Fuji, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 617 days.

(21) Appl. No.: 12/890,270

(22) Filed: Sep. 24, 2010

(65) Prior Publication Data
US 2011/0072840 A1 Mar. 31, 2011

(30) Foreign Application Priority Data
Sep. 30, 2009 (JP) ................................. 2009-225954
Oct. 15, 2009 (JP) ................................. 2009-237875

(51) Int. Cl.
*F25B 41/04* (2006.01)
*F25B 13/00* (2006.01)
(Continued)

(52) U.S. Cl.
CPC . *F25B 13/00* (2013.01); *F24D 3/18* (2013.01); *F25B 2313/02741* (2013.01); *F25B 2313/0314* (2013.01); *F25B 2313/0315* (2013.01); *F25B 2339/047* (2013.01); *F25B 2400/13* (2013.01); *F25B 2600/0253* (2013.01); *F25B 2600/13* (2013.01); *F25B 2600/19* (2013.01);
(Continued)

(58) Field of Classification Search
USPC ................ 62/160, 174, 206, 222, 225, 324.4, 62/324.6, 238.1, 503
See application file for complete search history.

(56) References Cited

U.S. PATENT DOCUMENTS 4,420,947 A * 12/1983 Yoshino ........................... 62/160
4,481,788 A * 11/1984 Yoshino ........................... 62/181
(Continued)

FOREIGN PATENT DOCUMENTS

EP 2 211 127 A1 7/2010
JP H0443261 A 2/1992
(Continued)

OTHER PUBLICATIONS

Notification of Reasons for Refusal in Japanese Patent Application No. 2009-237875, dated Jul. 9, 2013.
(Continued)

*Primary Examiner* — Marc Norman
*Assistant Examiner* — Paolo Gonzalez
(74) *Attorney, Agent, or Firm* — Venable LLP; Michael A. Sartori; Tamatane J. Aga

(57) ABSTRACT

A heat pump apparatus includes: a refrigerant circuit which includes a compressor, an utilization-side heat exchanger, a first expansion valve, and an outdoor heat exchanger; an injection pipe which includes a solenoid switching valve and a second expansion valve; and an objective supercooling degree table which stores objective supercooling degrees according to condensing pressure in the refrigerant circuit and rotation number of the compressor. In the heat pump apparatus, liquid refrigerant is injected to the compressor by way of the injection pipe. The heat pump apparatus switches between a first case where the liquid refrigerant is injected to the compressor and a second case where the liquid refrigerant is not injected, and a value of the objective supercooling degree is changed between the first case and the second case to control the first expansion valve based on the value of the objective supercooling degree.

12 Claims, 9 Drawing Sheets

(51) Int. Cl.
*F24D 3/18* (2006.01)
*F25B 31/00* (2006.01)

(52) U.S. Cl.
CPC . *F25B2600/2509* (2013.01); *F25B 2600/2513* (2013.01); *F25B 2700/195* (2013.01); *F25B 2700/21* (2013.01); *F25B 2700/2106* (2013.01); *F25B 2700/21152* (2013.01); *Y02B 30/741* (2013.01); *Y02B 30/745* (2013.01); *F25B 31/008* (2013.01)

(56) References Cited

U.S. PATENT DOCUMENTS

| | | | |
|---|---|---|---|
| 5,651,263 A * | 7/1997 | Nonaka et al. | 62/205 |
| 5,987,903 A * | 11/1999 | Bathla | 62/129 |
| 6,073,459 A * | 6/2000 | Iritani | 62/204 |
| 6,397,616 B2 * | 6/2002 | Yamasaki et al. | 62/244 |
| 7,275,385 B2 * | 10/2007 | Abel et al. | 62/324.4 |
| 2006/0080989 A1 * | 4/2006 | Aoki et al. | 62/324.4 |
| 2008/0210768 A1 * | 9/2008 | You | 237/2 B |
| 2008/0229770 A1 * | 9/2008 | Liu | 62/225 |
| 2008/0236184 A1 * | 10/2008 | Morozumi et al. | 62/324.6 |
| 2009/0199581 A1 * | 8/2009 | Ushijima et al. | 62/238.7 |

FOREIGN PATENT DOCUMENTS

| | | |
|---|---|---|
| JP | H06-035868 U | 5/1994 |
| JP | 11-270918 A | 10/1999 |
| JP | 3080558 A | 8/2000 |
| JP | 2001-066000 A | 3/2001 |
| JP | 2001-108343 A | 4/2001 |
| JP | 2005-055150 A | 3/2005 |
| JP | 2006-112753 A | 4/2006 |
| JP | 2008-138993 A | 6/2008 |
| JP | 2008-309486 A | 12/2008 |
| JP | 2009-127939 A | 6/2009 |

OTHER PUBLICATIONS

Notification of Reasons for Refusal in Japanese Patent Application No. 2009-237875, dated Mar. 25, 2014.
Extended European Search Report in European Patent Application No. 10180517.4, dated Sep. 29, 2014.

* cited by examiner

FIG. 2

| STATE OF CONDENSING PRESSURE | RISING | DROPPING | RISING | DROPPING | RISING | DROPPING |
|---|---|---|---|---|---|---|
| THRESHOLD VALUE OF CONDENSING PRESSURE P (MPaG) | P2<P | P1<P | P2≦P<P4 | P1≦P<P4 | P4≦P | P3≦P |
| ROTATION NUMBER F OF COMPRESSOR (rps) — F2≦F | | T7 | | T6 | | T4 |
| F1≦F<F2 | T7 | T6 | T6 | T5 | | T3 |
| F<F1 | T3 | T3 | T2 | T2 | T1 | T1 |

FIG. 3

| CONDENSING PRESSURE P (MPaG) | | ROTATION NUMBER F OF COMPRESSOR (rps) | | | | | | |
|---|---|---|---|---|---|---|---|---|
| RISING | DROPPING | RISING F<F11 | DROPPING F<F10 | RISING F11≦F<F13 | DROPPING F10≦F<F12 | RISING F13≦F | DROPPING F12≦F |
| P15≦P | P14≦P | L2 | | L3 | | L4 | F12≦F |
| P13≦P<P15 | P12≦P<P14 | OFF | | OFF | | L3 | |
| P11≦P<P13 | P10≦P<P12 | OFF | | OFF | | L1 | |
| P<P11 | P<P10 | OFF | | OFF | | OFF | |

| OBJECTIVE SC VALUE | COP | |
|---|---|---|
| | INJECTION ON | INJECTION OFF |
| 4 | 1.81 | |
| 5 | 1.83 | |
| 6 | 1.81 | 1.79 |
| 6.5 | 1.77 | 1.81 |
| 7 | 1.73 | 1.82 |
| 8 | | 1.78 |
| 9 | | 1.73 |

MEASURING CONDITION
OUTDOOR AIR TEMPERATURE: -10°C
HOT WATER TEMPERATURE: 60°C
COMPRESSOR ROTATION NUMBER: 74rps
CONDENSING PRESSURE: 3.90MPaG

FIG. 6

| STATE OF CONDENSING PRESSURE P | | RISING | DROPPING | RISING | DROPPING | RISING | DROPPING |
|---|---|---|---|---|---|---|---|
| THRESHOLD VALUE OF CONDENSING PRESSURE P (MPaG) | | P2<P | P1<P | P2≦P<P4 | P1≦P<P4 | P4≦P | P3≦P |
| ROTATION NUMBER F OF COMPRESSOR (rps) | F2≦F | T17 | | T16 | | T14 | |
| | F1≦F<F2 | T16 | | T15 | | T13 | |
| | F<F1 | T13 | | T12 | | T11 | | ure. When the expansion valve is controlled so as to obtain the objective SC value at the time when the injection is not executed, the COP is deteriorated and the operation at the high coefficient of performance is unable to be continued.

HEAT PUMP APPARATUS USING SUPERCOOLING DEGREE TO CONTROL EXPANSION VALVE

This application claims priority from Japanese Patent Application No. 2009-225954, filed on Sep. 30, 2009, and Japanese Patent Application No. 2009-237875, filed on Oct. 15, 2009, the entire contents of which are hereby incorporated by reference.

FIELD OF THE INVENTION

The present invention relates to a heat pump apparatus such as a heat pump type floor heater, a water heater, etc., and more particularly, to the heat pump apparatus in which efficient operation control suitable for generating hot water is executed.

DESCRIPTION OF RELATED ART

Generally, an air conditioner is a typical apparatus as a heat pump apparatus. As the air conditioner which can exert high heating ability at high coefficient of performance (COP), even in case where an outdoor air temperature is low, there has been proposed an related-art air conditioner provided with a refrigerant circuit for injecting liquid refrigerant to a compressor (For example, see Japanese Patent No. 3080558).

In the related-art air conditioner disclosed in Japanese Patent No. 3080558, a compressor, a utilization-side heat exchanger, an expansion valve, and an outdoor heat exchanger are connected, and an injection pipe provided with an expansion valve for liquid injection is connected to a mechanism part of the compressor. In the related-art air conditioner, during heating operation when the outdoor air temperature is low, rotation number of the compressor is controlled according to a difference between an indoor air temperature and an objective indoor air temperature to be controlled (a set temperature), and at the same time, a part of the liquid refrigerant which has been condensed in the utilization-side heat exchanger is injected to the mechanism part of the compressor, thereby to control the expansion valve for liquid injection according to a difference between a discharging temperature of the compressor and an objective discharging temperature. In this manner, a flow rate of the refrigerant in the utilization-side heat exchanger is increased, and high heating ability can be exerted, even in case where the outdoor air temperature is low.

On the other hand, there exists a heat pump apparatus such as a heat pump type floor heater, which is another type of the heat pump apparatus, in which the hot water is generated by exchanging heat between water and refrigerant in the utilization-side heat exchanger. In this type of the heat pump apparatus too, in case where the outdoor air temperature is low, and discharging water having high temperature is required, the liquid refrigerant is injected to the compressor thereby to increase the flow rate of the refrigerant in the utilization-side heat exchanger. In this manner, the discharging water having the high temperature is realized, even in case where the outdoor air temperature is low.

In the heat pump apparatus in which the heat exchange is performed between the water and the refrigerant, a change of supercooling degree gives a larger influence to the COP, as compared with the air conditioner in which the heat exchange is performed between the air and the water. Therefore, in order to attain the operation at the high coefficient of performance in such type of the heat pump apparatus, it is necessary to appropriately control the supercooling degree. As means for controlling the supercooling degree, the supercooling degree at the highest COP under particular operation conditions (the rotation number of the compressor, condensing pressure, etc.) is set to be the optimal supercooling degree in the relevant operation (hereinafter, referred to as the optimal SC value), and this optimal supercooling degree is set as the objective supercooling degree (hereinafter, referred to as the objective SC value). Then, the heat pump apparatus is operated by controlling the expansion valve so that the supercooling degree may reach the objective SC value, under the respective operation conditions in operating the apparatus.

However, in case where the liquid refrigerant has been injected, the flow rate of the refrigerant is increased in the utilization-side heat exchanger, and the objective SC value is varied due to the increase of the flow rate or other factors. When the expansion valve is controlled so as to obtain the objective SC value at the time when the injection is not executed, the COP is deteriorated and the operation at the high coefficient of performance is unable to be continued.

SUMMARY OF INVENTION

Illustrative aspects of the present invention provide a heat pump apparatus which can exert high heating ability, and can be operated at high coefficient of performance, irrespective of whether or not liquid refrigerant is injected.

According to a first aspect of the invention, a heat pump apparatus includes: a refrigerant circuit which includes a compressor, an utilization-side heat exchanger, a first expansion valve, and an outdoor heat exchanger; an injection pipe which includes a solenoid switching valve and a second expansion valve; and an objective supercooling degree table which stores objective supercooling degrees according to condensing pressure in the refrigerant circuit and rotation number of the compressor. In the heat pump apparatus, liquid refrigerant is injected to the compressor by way of the injection pipe. The heat pump apparatus switches between a first case where the liquid refrigerant is injected to the compressor and a second case where the liquid refrigerant is not injected, and a value of the objective supercooling degree is changed between the first case and the second case to control the first expansion valve based on the value of the objective supercooling degree.

According to a second aspect of the invention, a heat pump apparatus includes: a refrigerant circuit which includes a compressor, an utilization-side heat exchanger, a first expansion valve, and an outdoor heat exchanger; an injection pipe which includes a solenoid switching valve and a second expansion valve; and an objective supercooling degree table which stores objective supercooling degrees according to condensing pressure in the refrigerant circuit and rotation number of the compressor. In the heat pump apparatus, liquid refrigerant is injected to the compressor by way of the injection pipe. The heat pump apparatus switches between a first case where the liquid refrigerant is injected to the compressor and a second case where the liquid refrigerant is not injected. In the second case, the first expansion valve is controlled to be opened or closed so that the operation is continued at the objective supercooling degree which is extracted from the objective supercooling degree table. In the first case, the objective supercooling degree which is extracted from the objective supercooling degree table is corrected by a determined value, and the first expansion valve is controlled so that the operation is continued at the corrected supercooling degree.

According to a third aspect of the invention, a heat pump apparatus includes: a refrigerant circuit which includes a compressor, an utilization-side heat exchanger, a first expansion valve, and an outdoor heat exchanger; an injection pipe which includes a solenoid switching valve and a second expansion valve; an objective supercooling degree table which stores objective supercooling degrees according to condensing pressure in the refrigerant circuit and rotation number of the compressor; and a corrected objective supercooling degree table which stores supercooling degrees which have been obtained, by uniformly correcting the respective supercooling degrees stored in the objective supercooling degree table, according to the condensing pressure in the refrigerant circuit and the rotation number of the compressor. In the heat pump apparatus, liquid refrigerant is injected to the compressor by way of the injection pipe. The heat pump apparatus switches between a first case where the liquid refrigerant is injected to the compressor, and a second case where the liquid refrigerant is not injected. In the second case, the first expansion valve is controlled to be opened or closed so that the operation is continued at the objective supercooling degree which is extracted from the objective supercooling degree table. In the first case, the first expansion valve is controlled so that the operation is continued at the supercooling degree which is extracted from the corrected objective supercooling degree table.

Other aspects and advantages of the invention will be apparent from the following description, the drawings and the claims.

BRIEF DESCRIPTION OF THE DRAWINGS

FIG. 2 is a table of objective SC values in the exemplary embodiment according to the invention.

FIG. 3 is a table of pulse number of a second expansion valve in the exemplary embodiment.

FIG. 6 is a table of corrected objective SC values in another exemplary embodiment according to the invention.

DETAILED DESCRIPTION OF EXEMPLARY EMBODIMENTS

Now, an exemplary embodiment according to the invention will be described in detail, referring to the attached drawings. In the exemplary embodiment, a heat pump apparatus such as a floor heater, a water heater, etc. which has an indoor unit, and conducts heat exchange between water and refrigerant in a utilization-side heat exchanger will be described, as an example. The invention is not limited to the exemplary embodiment as described below, but various modifications can be added to the invention within a scope not deviating from a gist of the invention.

Exemplary Embodiment 1

Figure 1:
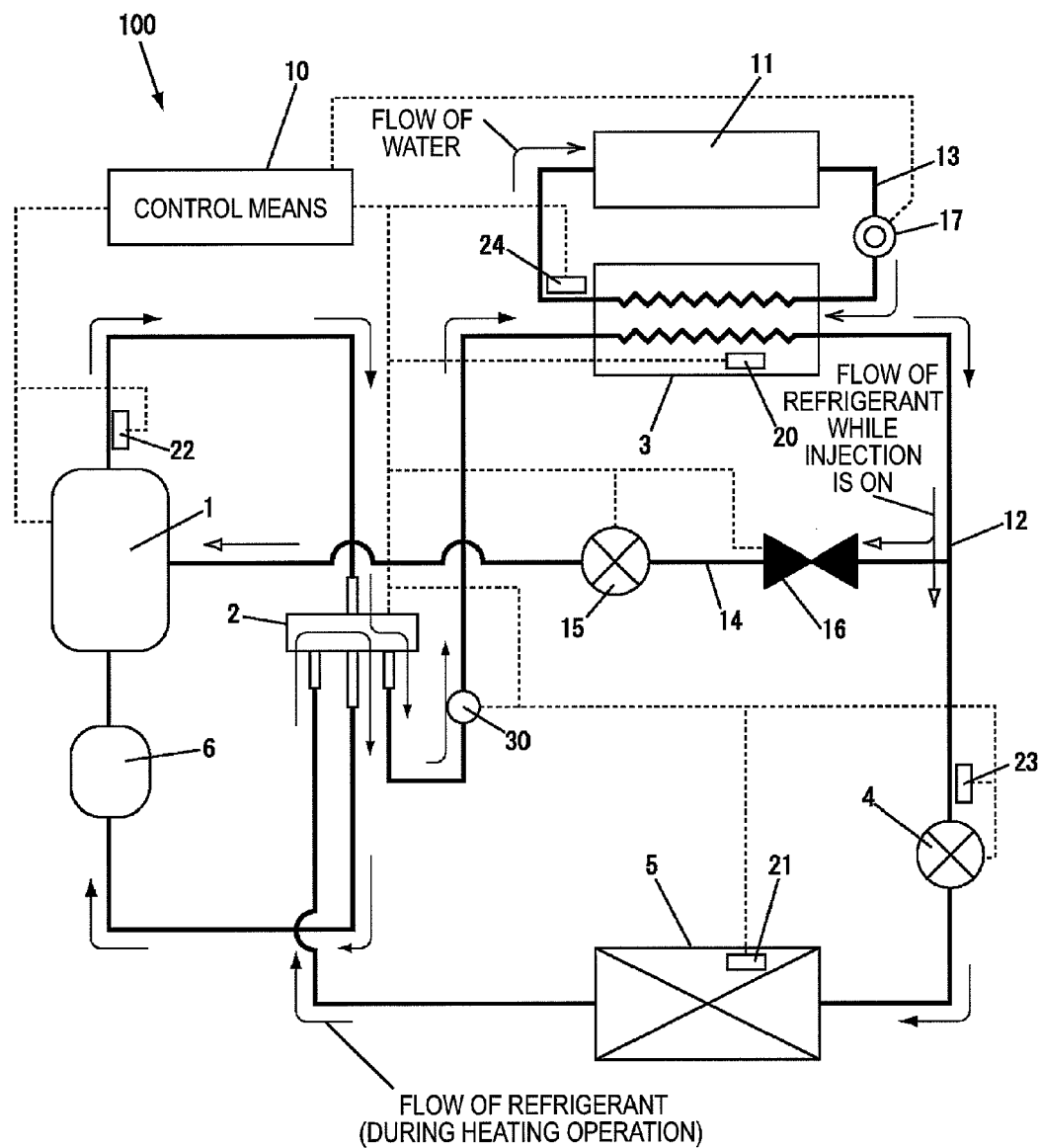
FIG. 1 is a structural view showing a heat pump apparatus in an exemplary embodiment according to the invention.

FIG. 1 shows structure of the heat pump apparatus according to the invention. The heat pump apparatus 100 includes a refrigerant circuit in which a compressor 1, a four way valve 2, an utilization-side heat exchanger 3 for conducting heat exchange between refrigerant and water, a first expansion valve 4, an outdoor heat exchanger 5, and an accumulator 6 are sequentially connected by means of a refrigerant pipe 12, and is so constructed that a direction of circulating the refrigerant is converted by switching the four way valve 2. Moreover, an inlet of the refrigerant of the compressor 1, which is not shown, is connected to the refrigerant pipe 12 at a point between the utilization-side heat exchanger 3 and the first expansion valve 4, by means of an injection pipe 14 having a second expansion valve 15 and a solenoid switching valve 16.

The utilization-side heat exchanger 3 is provided with a heat exchange temperature sensor 20 for detecting temperature of the refrigerant flowing through the refrigerant pipe 12, and the outdoor heat exchanger 5 is provided with an outdoor air temperature sensor 21 for detecting outdoor air temperature. Moreover, a discharging temperature sensor 22 for detecting discharging temperature of the refrigerant is provided near a discharging outlet of the compressor 1, and a refrigerant temperature sensor 23 for detecting the temperature of the refrigerant near the first expansion valve 4 is provided between the utilization-side heat exchanger 3 and the first expansion valve 4. Further, the refrigerant pipe 12 is provided with a pressure sensor 30 for detecting discharging pressure of the compressor 1, at a discharging side of the compressor 1 (at a position where the refrigerant flows from the four way valve 2 into the refrigerant pipe 12).

The refrigerant pipe 12 and a water pipe 13 are connected to the utilization-side heat exchanger 3. Moreover, an indoor unit 11 and a hot water pump 17 for circulating the water is connected to the water pipe 13, thereby to circulate the water after the heat exchange has been performed between the water and the refrigerant. In addition, a discharging hot water temperature sensor 24 is provided near an outlet of the water in the utilization-side heat exchanger 3.

The heat pump apparatus 100 is provided with control means 10 for controlling the heat pump apparatus 100, by actuating and controlling the compressor 1, the four way valve 2, the hot water pump 17, the solenoid switching valve 16, the first expansion valve 4, and the second expansion valve 15, according to the temperatures detected by the respective temperature sensors and the pressure detected by the discharging pressure sensor 30, or according to a demand for operation from a user by means a remote controller or the like, which is not shown. The control means 10 controls the rotation number of the compressor 1, by controlling output frequency of an inverter, which is not shown, thereby to operate the compressor 1. The rotation number of the compressor 1 is periodically stored, as rotation controlling data, in a memory part of the control means 10, which is not shown.

In FIG. 1, a direction of a flow of the refrigerant during heating operation, a direction of a flow of the refrigerant in case where the second expansion valve 15 and the solenoid switching valve 16 are opened and the refrigerant flows into the injection pipe 14 (hereinafter, this state is referred to as "injection ON, and the other state is referred to as "injection OFF"), and a direction of a flow of hot water in the water pipe 13 are respectively shown by arrow marks. Although a direction of a flow of the refrigerant during cooling operation is reverse to the direction of the flow of the refrigerant during the heating operation, this direction of the flow of the refrigerant is not shown by an arrow mark in FIG. 1.

The heat pump apparatus 100 having the above described structure is operated as follows. When the user turns on a switch by operating the remote controller or the like of the indoor unit 11, operation of the heat pump apparatus 100 is started, and the control means 10 rotates the hot water pump 17 thereby to circulate the water between the utilization-side heat exchanger 3 and the indoor unit 11.

At the same time, the control means 10 operates the compressor 1 so that the current discharging hot water detected by the discharging hot water temperature sensor 24, that is, the temperature of the water which has been heated by the utilization-side heat exchanger 3 may reach an objective temperature (set temperature) which has been set in advance. The refrigerant which has become gas having high pressure and high temperature in the compressor 1 passes through the four way valve 2, and discharges heat in the utilization-side heat exchanger 3 to be liquidized. Then, the liquidized refrigerant is reduced in pressure by the first expansion valve 4, vaporized in the outdoor heat exchanger 5 to be gasified by exchanging heat with the outdoor air, and again, compressed by the compressor 1. This process is repeated. The four way valve 2 is used for reversing the direction of circulating the refrigerant during cooling and defrosting operations.

Then, a method of controlling the supercooling degree will be described. The control means 10 calculates the current supercooling degree based on the discharging pressure detected by the pressure sensor 30 and the refrigerant temperature detected by the refrigerant temperature sensor 23. Moreover, the control means 10 treats the discharging pressure which is periodically detected by the pressure sensor 30 as the condensing pressure (because the condensing pressure is substantially the same as the discharging pressure detected by the pressure sensor 30), and data of the condensing pressure is stored in the memory part (not shown) of the control means 10, as condensing pressure controlling data. The control means 10 extracts the current condensing pressure data from the condensing pressure controlling data, and further, extracts the current rotation number of the compressor 1 from the rotation controlling data.

In the memory part of the control means 10, a table of objective SC values (T) as shown in FIG. 2 is stored. This objective SC value (T) table contains the objective SC values (unit: ° C.) under respective conditions at the injection OFF. Items in a left column represent from above to below, "state of condensing pressure", "threshold value of condensing pressure" (unit: MPaG), and "rotation number of compressor" (unit: rps). In FIG. 2, P is a value of the condensing pressure, F is a value of the rotation number of the compressor, and T is the objective SC value, and it is meant that the respective values are smaller, as attached numerals are smaller.

The "rotation number of compressor" is divided into three zones, specifically, less than F1, from F1 to F2, and more than F2. Moreover, in the "state of condensing pressure", whether the condensing pressure is rising or dropping from the "threshold value of condensing pressure" is discriminated. For example, in case where the condensing pressure P is rising from a value smaller than P2 to a value larger than P2, in FIG. 2, the "state of condensing pressure" is deemed to be rising. In case where the condensing pressure P is dropping from a value larger than P1 to a value smaller than P1, the "state of condensing pressure" is deemed to be dropping.

The control means 10 determines the latest state of the condensing pressure whether it is raising or dropping, and extracts the latest condensing pressure data from the condensing pressure controlling data, and the latest rotation number of the compressor 1 from the rotation controlling data of the compressor 1, respectively. Moreover, the control means also extracts the objective SC value from the "state of condensing pressure", and the "threshold value of condensing pressure", and from the respective zones of the "rotation number of compressor" in the objective SC value (T) table.

Then, the control means 10 calculates the current supercooling degree, compares this calculated supercooling degree with the objected SC value, and adjusts an opening degree of the first expansion valve 4 according to a difference between them. The current supercooling degree is obtained, for example, by deducting the current temperature detected by the refrigerant temperature sensor 23 from a liquidizing temperature which is calculated from the current condensing pressure (discharging pressure).

The control means 10 deducts the objective SC value from the current supercooling degree. When the result of this deduction is plus, the control means 10 controls the opening degree of the first expansion valve 4 so as to open the first expansion valve 4 according to the result value of this deduction, and when the result of this deduction is minus, the control means 10 controls the opening degree of the first expansion valve 4 so as to close the first expansion valve 4 according to the result value of the deduction. By controlling the opening degree in this manner, the current supercooling degree is always controlled so as to reach the objective SC value, and consequently, the COP is maintained at a high level.

As the usual control, the control means 10 rotates the compressor 1 so that the current temperature of the discharging hot water which is detected by the discharging hot water temperature sensor 24, that is, the temperature of the water which has been heated in the utilization-side heat exchanger 3 may reach the objective temperature of the discharging hot water which has been set in advance. On this occasion, the first expansion valve 4 is controlled so as to correspond to the rotation number of the compressor 1. On the other hand, adjustment of the first expansion valve 4 according to the control of the supercooling degree is executed by controlling the opening degree within a relatively small range. Specifically, relatively large control of the opening degree of the first expansion valve 4 corresponds to the rotation number of the compressor 1 which is determined by a difference between the current temperature of the discharging hot water and the objective temperature of the discharging hot water. The adjustment of the first expansion valve 4 according to the control of the supercooling degree is executed so as to correct the opening degree.

Then, a method of controlling the injection ON/OFF will be described. In case where the outdoor air temperature which is detected by the outdoor air temperature sensor 21 is lower than a determined temperature (lower than 10° C., for example), the control means 10 determines whether the injection is ON or OFF, referring to a table of pulse number of the second expansion valve as shown in FIG. 3.

An opening degree of the second expansion valve 15 which is arranged in the injection pipe 14 is determined according to the pulse number of a control signal which is outputted from the control means 10 to a stepping motor for opening or closing the valve, and controlled in such a manner that as the pulse number becomes larger, the opening degree of the second expansion valve 15 becomes larger correspondingly.

The table of the pulse number of the second expansion valve 15 as shown in FIG. 3 is stored in the memory part of the control means 10, and the pulse number L of the control signal outputted from the control means 10 is stored in the second expansion valve pulse number table. In the second expansion valve pulse number table, the pulse number of the control signal which is outputted from the control means 10 is determined according to state of values (rising or dropping) in items "condensing pressure" (unit: MPaG), and "rotation number of compressor" (unit: rps), and the threshold value. Moreover, provided that the condensing pressure is P, the rotation number of the compressor is F, and the pulse number is L, it is meant that as numerals attached to the symbols are smaller, the respective values are smaller.

The "condensing pressure" is divided into four zones, while the condensing pressure is rising, specifically, less than P11, from P11 to P13, from P13 to P15, and more than P15, and divided into four zones, while the condensing pressure is dropping, specifically, less than P10, from P10 to P12, from P12 to P14, and more than P14. Moreover, the "rotation number of compressor" is divided into three zones, while the rotation number is rising, specifically, less than F11, from F11 to F13, and more than F13, and divided into three zones, while the rotation number is dropping, specifically, less than F10, from F10 to F12, and more than F12.

Moreover, rising/dropping of the condensing pressure is for the purpose of discriminating whether the condensing pressure is rising or dropping from the threshold value of the condensing pressure. For example, in case where the condensing pressure P is rising from a value smaller than P11 to a value larger than P11, in FIG. 3, it is deemed that the condensing pressure is rising. In case where the condensing pressure P is dropping from a value larger than P10 to a value smaller than P10, it is deemed that the condensing pressure is dropping. Moreover, rising/dropping of the rotation number of the compressor is for the purpose of discriminating whether the rotation number of the compressor is rising or dropping from the threshold value. For example, in case where the rotation number of the compressor F is rising from a value smaller than F11 to a value larger than F11, in FIG. 3, it is deemed that the rotation number is rising, and in case where the rotation number of the compressor F is dropping from a value larger than F10 to a value smaller than F10, it is deemed that the rotation number is dropping.

In case where "OFF" is shown in FIG. 3, it means that when the rotation number F of the compressor is less than F11 (rising) or less than F10 (dropping), and the condensing pressure P is less than P11 (rising) or less than P10 (dropping), the control means 10 does not output the control signal to the second expansion valve 15, and therefore, the second expansion valve 15 is closed, that is, the injection is turned OFF. In case where "L1 to L4" are shown in FIG. 3, it means that the control means 10 outputs the control signal to the second expansion valve 15, and the second expansion valve 15 is opened at the opening degree according to the pulse number of the inputted control signal, that is, the injection is turned ON. It is to be noted that the solenoid switching valve 16 is opened at the same time when the control signal is outputted from the control means 10 to the second expansion valve 15, and closed in case where the control signal is not outputted.

The control means 10 determines the state of rising or dropping of the latest condensing pressure and the rotation number of the compressor, and extracts the latest condensing pressure data from the condensing pressure controlling data and the latest rotation number of the compressor 1 from the rotation controlling data of the compressor 1, respectively. Then, the control means 10 extracts "OFF" (the control signal is not outputted to the second expansion valve 15), or either of the pulse numbers L1 to L4 to be outputted, from the respective zones in the items of the "condensing pressure" and the "rotation number of compressor".

When the control means 10 extracts the pulse number of L1 to L4, the solenoid switching valve 16 is opened, and at the same time, the control signal having the pulse number of L1 to L4 is outputted to the second expansion valve 15 thereby to open the second expansion valve 15 at the opening degree corresponding to the pulse number, to turn the injection ON. When the injection is turned ON, the liquid refrigerant is injected to the mechanism part of the compressor 1, whereby the discharging temperature of the compressor 1 is lowered, and an amount of the refrigerant circulating in the utilization-side heat exchanger 3 is increased. As the results, even in case where the outdoor air temperature is low and the high temperature discharging hot water is required, the flow rate of the refrigerant in the utilization-side heat exchanger is increased, and high heating ability can be exerted.

Then, a method of correcting the objective SC value during the injection ON will be described. While the injection is OFF, the control means 10 extracts the objective SC value corresponding to the latest state of the condensing pressure as to rising/dropping, the latest condensing pressure data, and the latest rotation number of the compressor 1 from the objective SC value (T) table in FIG. 2, and adjusts the opening degree of the first expansion valve 4 based on a difference between the objective SC value and the current supercooling degree thereby to control the supercooling degree.

When the outdoor air temperature becomes lower than the determined temperature (lower than 10° C., for example), the control means 10 extracts the pulse number of L1 to L4, referring to the second expansion valve pulse number table in FIG. 3, and outputs the control signal having the pulse number corresponding to L1 to L4 to the second expansion valve 15, thereby to open the second expansion valve 15. Then, the injection is turned ON, and the liquid refrigerant is injected to the mechanism part of the compressor 1.

When the injection is turned ON, an amount of the refrigerant flowing in the utilization-side heat exchanger 3 is increased, and the optimal SC value, that is, the objective SC value is varied due to this increase. Therefore, the control means 10 determines the state of the condensing pressure, as to rising/dropping while the injection is ON. Moreover, the control means 10 extracts the latest condensing pressure data from the condensing pressure controlling data and the latest rotation number of the compressor 1 from the rotation controlling data of the compressor 1, respectively, and extracts the objective SC value, referring to the objective SC value (T) table in FIG. 2. Then, the control means 10 corrects all the extracted objective SC values by the determined value (−2° C., for example) which has been stored in advance in the memory part. Then, the control means 10 adjusts the opening degree of the first expansion valve 4 based on a difference between the corrected objective SC value and the current supercooling degree, thereby to control the supercooling degree.

Figures 4A, 4B:
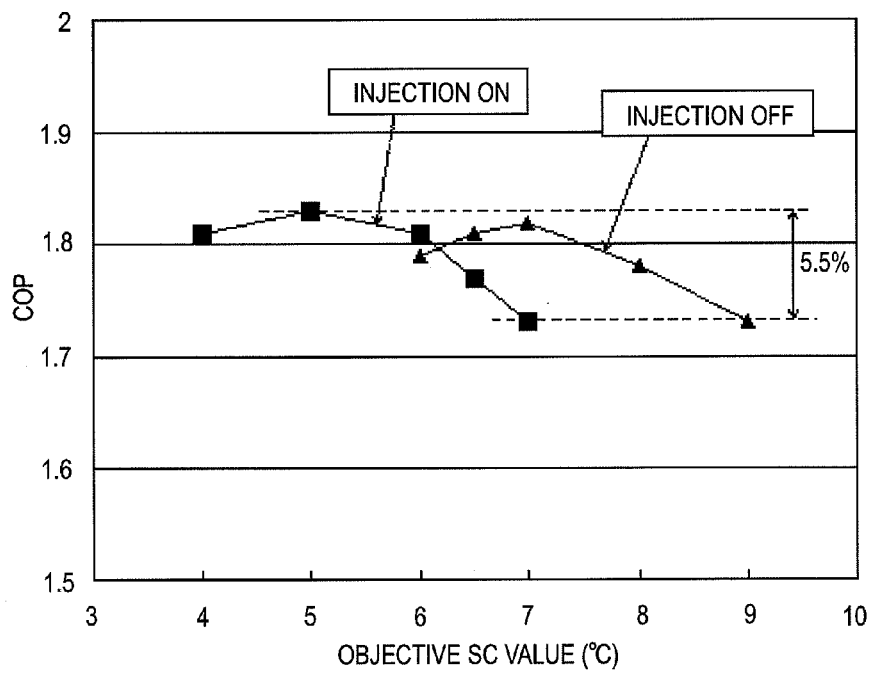
FIGS. 4A and 4B are comparative diagrams showing results of comparison of COP as to whether correction of the objective SC value has been executed or not, in the exemplary embodiment.

FIGS. 4A and 4B are comparative diagrams showing results of comparison of the COP between a case where the correction of the objective SC value has been performed or a case where the correction has not been performed, while the injection is ON, as described above. FIG. 4A is a table in which the COP values are compared at every objective SC value, while the injection is ON and OFF. In this table, items in a left column show the objective SC values (unit: ° C.), and items in a right column show the COP values while the injection is ON and OFF. FIG. 4B is a graph showing the COP values in FIG. 4A, in which a Y-axis represents the COP value, and an X-axis represents the objective SC values (unit: ° C.). In FIGS. 4A and 4B, there are shown the results of actual measurement of the heat pump apparatus 100, as an example, when the outdoor air temperature is −10° C., the discharging hot water temperature is 60° C., the rotation number of the compressor 1 is 74 rps, and the condensing pressure is 3.90 MPaG.

In FIGS. 4A and 4B, it is found that the objective SC value at which the COP value is the highest, while the injection is OFF, is 7° C., and the COP value at this moment is 1.82. On the other hand, the objective SC value at which the COP value is the highest, while the injection is ON, is 5° C., and the COP value at this moment is 1.83. If the heat pump apparatus 100 is controlled keeping the objective SC value at 7° C., while the injection is ON, the COP value is 1.73, in FIGS. 4A and 4B. This means that the COP value is deteriorated by about 5.5%, as compared with the COP value (1.83) when the objective SC value is 5° C.

On this occasion, by correcting the objective SC value from 7° C. to 5° C., when the injection is ON, the highest COP value is 1.83, as described above, which is substantially equal to the highest COP value 1.82, when the injection is OFF. In this manner, by correcting the objective SC value when the injection is ON, the COP value can be maintained at a high level in operating the heat pump apparatus 100.

As described above, by correcting the objective SC value on occasion of injecting the liquid refrigerant, it is possible to perform continuous operation of the heat pump apparatus 100 at the optimal SC value, and accordingly, it is possible to continue the operation at the high coefficient of performance, without deteriorating the COP. Moreover, for correcting the objective SC value, the values stored in the objective SC value (T) table which has been stored in advance in the control means 10 are uniformly corrected by the determined value. Therefore, a table of the corrected objective SC values need not be separately stored, and at the same time, the control can be simply executed. As the results, load on the memory part and the process of the control means 10 can be reduced.

The data values which are used in the description of the exemplary embodiment, such as the condensing pressure data, the rotation number of the compressor and the objective SC values described in FIGS. 2 to 4B are the values which have been obtained by experiments, or the values determined based on these values, and the data values are different depending on the structure of the refrigerant circuit (a length of the pipeline, type of the refrigerant, etc.). Moreover, although the description of this exemplary embodiment has been made referring to a case where the objective SC values when the injection is ON are obtained by uniformly deducting the same value from the objective SC values in the objective SC value (T) table in FIG. 2, the invention is not limited to the case. Alternatively, it is possible to obtain the objective SC value when the injection is ON, by deducting or adding the value which has been set in advance under respective conditions (the threshold value of the condensing pressure, the rotation number of the compressor, etc.) for extracting the objective SC value in the objective SC value (T) table in FIG. 2, and stored in the memory part of the control means 10, from or to the objective SC values in the objective SC value (T) table in FIG. 2.

Figure 5A:
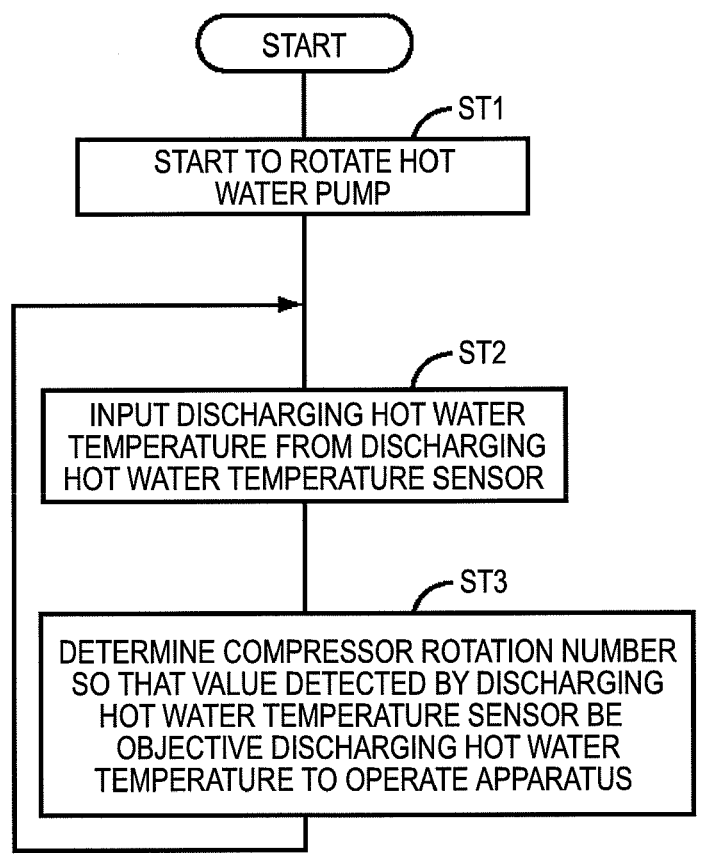
FIGS. 5A and 5B are flow charts for describing control in the exemplary embodiment.
Figure 5B:
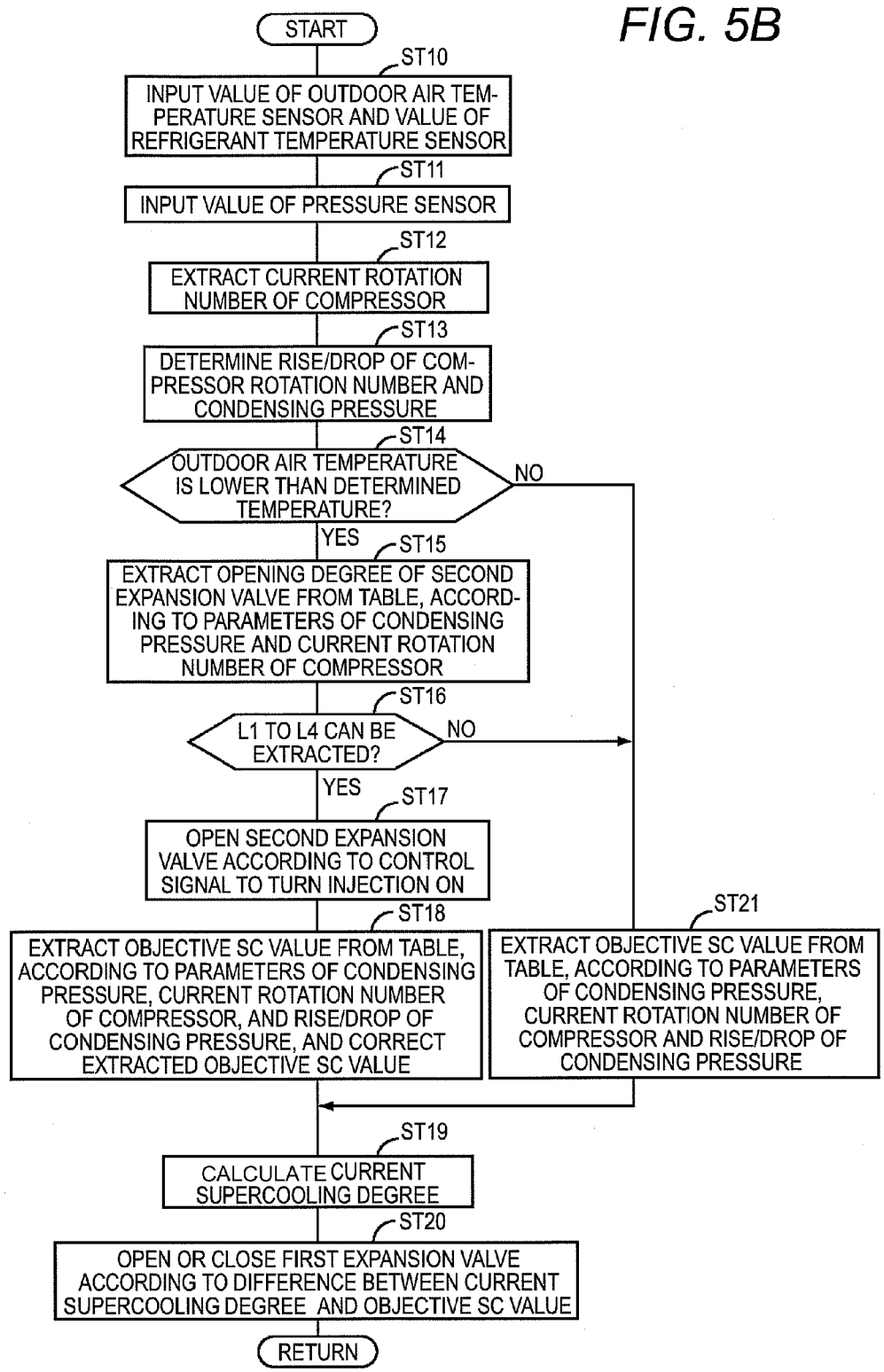

Then, referring to a flow chart for controlling the heat pump apparatus 100 as shown in FIGS. 5A and 5B, a flow of the process in the control means 10 will be described. FIG. 5A shows a main routine of the heat pump apparatus 100. FIG. 5B shows a routine for correcting the objective SC value according to the exemplary embodiment. This objective SC value correcting routine is operated in parallel with the main routine, and actuated at every fixed time by timer intrusion, so as to minutely adjust (correct) the opening degree of the first expansion valve 4 which has been controlled by the main routine.

In the flow charts in FIGS. 5A and 5B, 5T represents a step, and a numeral following the ST represents a step number. In FIGS. 5A and 5B, the process according to the exemplary embodiment will be mainly described, but description concerning general process such as setting operation by a user, detailed control of the temperature of the discharging hot water will be omitted.

As shown in FIG. 5A, when the control means 10 starts to control, rotation of the hot water pump 17 is started, thereby to circulate the water between the utilization-side heat exchanger 3 and the indoor unit 11 (ST1). Then, the control means 10 inputs the temperature of the water circulating from the discharging hot water temperature sensor 24, that is, the temperature of the discharging hot water (ST2). Then, the control means 10 determines the rotation number of the compressor 1 so that the value detected by the discharging hot water temperature sensor 24 may reach the discharging hot water temperature which has been set in advance, and rotates the compressor 1 thereby to operate the heat pump apparatus 100 (ST3). The opening degree of the first expansion valve 4 is controlled according to the rotation number of the compressor 1, as described above. Thereafter, jumping to ST2, the process will be repeated.

On the other hand, as shown in FIG. 5B, in parallel with the main routine which has been described above, the control means 10 inputs the temperature of the refrigerant just before the first expansion valve 4, from the refrigerant temperature sensor 23, and the outdoor air temperature, from the outdoor air temperature sensor 21 (ST10). Then, the discharging pressure of the compressor 1 (condensing pressure) from the pressure sensor 30 is inputted (ST11). Then, the current rotation number of the compressor 1 is extracted (ST12). The control means 10 also controls the compressor 1 so that the current rotation number may reach the objective rotation number, and therefore, stores the current rotation number too. Herein, this rotation number is extracted.

Then, a rise or a drop of the rotation number of the compressor 1 and the condensing pressure is determined (ST13). The control means 10 determines the each value depending on whether the values of the pressure sensor 30 and the rotation number of the compressor 1 which have been taken periodically at a plurality of times become larger or become smaller in time series, as described above. Then, the control means 10 determines whether or not the outdoor air temperature is lower than the determined temperature (10° C., for example) (ST14).

If the outdoor air temperature is lower than the determined temperature (ST14: Yes), the control means 10 extracts the pulse number to be outputted from the second expansion valve pulse number table as described in FIG. 3, using respective parameters of the condensing pressure, the rotation number of the compressor 1, and the rise or drop of the condensing pressure and the rotation number of the compressor 1 which have been obtained in ST11 to ST13 (ST15).

Then, the control means 10 determines whether or not the pulse number extracted in ST 15 is either of L1 to L4 (ST16). If the extracted pulse number is either of L1 to L4 (ST16:Yes), the control means 10 outputs the control signal having the pulse number of L1 to L4 to the second expansion valve 15 thereby to open the second expansion valve 15, and the injection is turned ON (ST17).

Then, the control means 10 extracts the objective SC value from the objective SC value (T) table as described in FIG. 2, using the respective parameters of the condensing pressure, the rotation number of the compressor 1, and the rise or drop of the condensing pressure and the rotation number of the compressor 1 which have been obtained in ST11 to ST13, and corrects the extracted objective SC value, by applying the correction value when the injection is ON, which is stored in the memory part (ST18).

Then, the current supercooling degree is calculated from the refrigerant temperature which has been detected in ST10, and the condensing temperature calculated from the discharging pressure which has been detected in ST11 (ST19). Thereafter, the opening degree of the first expansion valve 4 is minutely adjusted according to a difference between the objective SC value which has been extracted and corrected in ST18 and the current supercooling degree which has been calculated in ST19 (ST20).

Specifically, the objective SC value is deducted from the current supercooling degree, and the first expansion valve 4 is controlled to be opened, when the result of the deduction is plus, and controlled to be closed, when the result of the deduction is minus. Then, this process is returned to the step in the main routine as shown in FIG. 5A, in which intrusion of the objective SC value correcting routine has occurred.

In case where the outdoor air temperature is not lower than the determined temperature (ST14:No), and in case where L1 to L4 are not extracted ("OFF" is extracted) in ST16 (ST16: No), the control means 10 extracts the objective SC value from the objective SC value (T) table as described in FIG. 2, using the respective parameters of the condensing pressure, the rotation number of the compressor 1, and the rise or drop of the condensing pressure and the rotation number of the compressor 1 which have been obtained in ST11 to ST13 (ST21). Then, the process jumps to ST19.

Exemplary Embodiment 2

Now, a second exemplary embodiment of the heat pump apparatus according to the invention will be described. In this exemplary embodiment, the structure of the heat pump apparatus, the refrigerant circuit, operational principle of the injection ON/OFF, control of the supercooling degree when the injection is OFF, and effects of the correction of the objective SC value when the injection is ON are the same as in the first exemplary embodiment, and therefore, description of them will be omitted. The second exemplary embodiment is different from the first exemplary embodiment in that the memory part of the control means 10 has a table of corrected objective SC values (Tc) in which the objective SC values when the injection is ON are stored, and the supercooling degree is controlled by extracting the objective SC value from this corrected objective SC value (Tc) table.

In addition to the objective SC (T) table in FIG. 2, the corrected objective SC value (Tc) table as shown in FIG. 6 is stored in the memory part of the control means 10. In this corrected objective SC value (Tc) table, corrected objective SC values (unit: ° C., T11 to T17) under respective conditions when the injection is ON are stored. Items in FIG. 6 ("state of condensing pressure", "threshold value of condensing pressure", "rotation number of compressor" in the left column, and a threshold value of the condensing pressure P, zones of the rotation number of the compressor, and "rising"/"dropping", which is the state of the condensing pressure) are substantially the same as in FIG. 2, and will not be described here in detail.

The corrected objective SC values are the values which have been uniformly corrected by a determined value from the objective SC values (T1 to T7) stored in the objective SC (T) value table in FIG. 2. In case where the correction value is −2° C., for example, the corrected objective SC value Tc is a value deducted by 2° C. from the objective SC value T. Moreover, the corrected objective SC values T11 to T17 in the corrected objective SC value (Tc) table in FIG. 6 correspond to the objective SC values T1 to T7 in the objective SC value (T) table in FIG. 2, in such a manner that T11=T1−2, T12=T2−2, . . . , T17=T7−2.

When the injection is turned ON, an amount of the refrigerant flowing to the utilization-side heat exchanger 3 is increased, and the optimal SC value, that is, the objective SC value is varied due to this increase. Therefore, the control means 10 determines the state of the condensing pressure as to rising/dropping while the injection is ON, and extracts the latest condensing pressure data from the condensing pressure controlling data and the latest rotation number of the compressor 1 from the rotation controlling data of the compressor 1. Then, the control means 10 extracts the corrected objective SC value, referring to the corrected objective SC value (Tc) table in FIG. 6. Then, the control means 10 controls the supercooling degree, by adjusting the opening degree of the first expansion valve 4 based on a difference between the corrected objective SC value and the current supercooling degree.

As described above, by correcting the objective SC value on occasion of injecting the liquid refrigerant, it is possible to perform continuous operation of the heat pump apparatus 100 at the optimal SC value, and accordingly, it is possible to continue the operation at the high coefficient of performance, without deteriorating the COP. Moreover, the control of the supercooling degree is executed by extracting the corrected objective SC value stored in the corrected objective SC value (Tc) table which has been stored in advance in the control means 10. As the results, the control can be simply executed, and hence, load on the memory part and the process of the control means 10 can be reduced.

The data values which are used in the description of the exemplary embodiment, such as the condensing pressure, the rotation number of the compressor 1 and the objective SC values described in FIGS. 2 and 6 are the values which have been obtained by experiments, or the values determined based on these values, and the data values are different depending on the structure of the refrigerant circuit (a length of the pipeline, type of the refrigerant, etc.). Moreover, although the description of this exemplary embodiment has been made referring to a case where the corrected objective SC values in the corrected objective SC value (Tc) table in FIG. 6 are obtained by uniformly deducting the same value from the objective SC values in the objective SC value (T) table in FIG. 2, the invention is not limited to the case. Alternatively, it is possible to obtain the corrected objective SC values, by deducting or adding the value which has been set in advance under respective conditions (the threshold value of the condensing pressure, the rotation number of the compressor, etc.) for extracting the objective SC value in the objective SC value (T) table in FIG. 2, and stored in the memory part of the control means 10, from or to the objective SC values in the objective SC value (T) table in FIG. 2, and also possible to store the corrected objective SC values in the corrected objective SC value (Tc) table in FIG. 6.

Figure 7A:
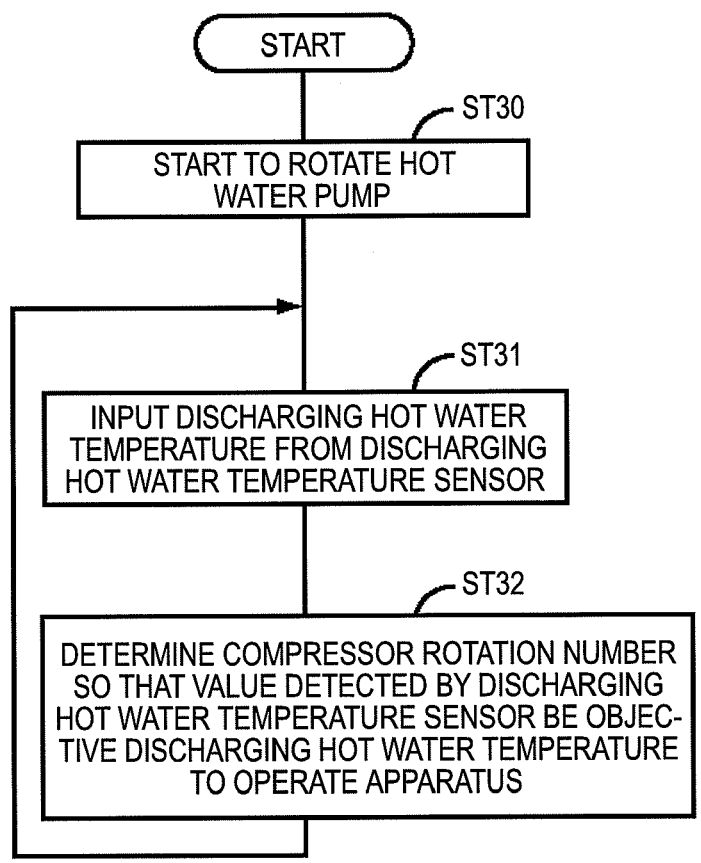
FIGS. 7A and 7B are flow charts for describing control in the other exemplary embodiment.
Figure 7B:
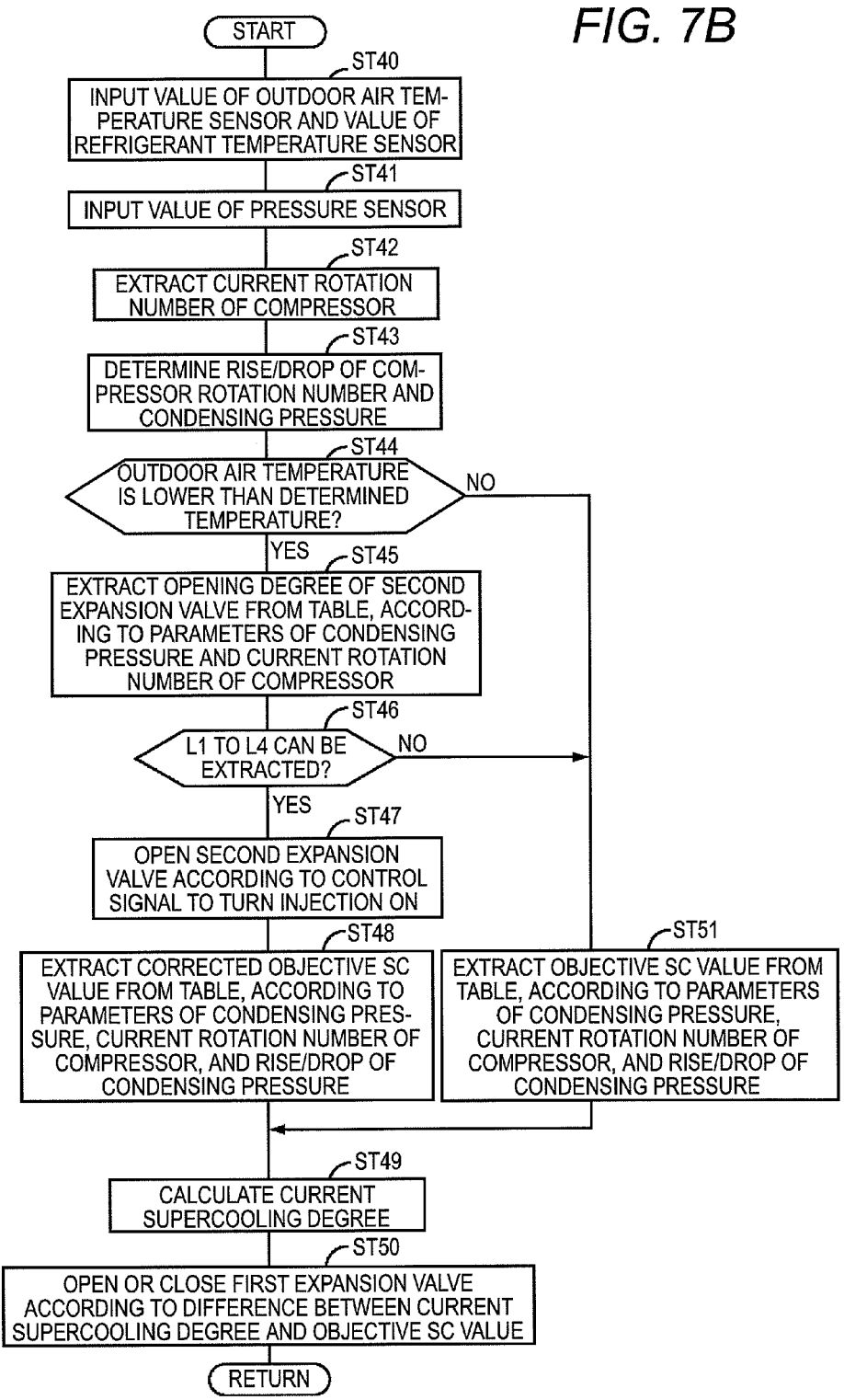

Then, referring to a flow chart for controlling the heat pump apparatus 100 as shown in FIGS. 7A and 7B, a flow of the process in the control means 10 will be described. FIG. 7A shows a main routine of the heat pump apparatus 100. FIG. 7B shows a routine for correcting the objective SC value according to the exemplary embodiment. This objective SC value correcting routine is operated in parallel with the main routine, and actuated at every fixed time by timer intrusion, so as to minutely adjust (correct) the opening degree of the first expansion valve 4 which has been controlled by the main routine.

In the flow charts in FIGS. 7A and 7B, ST represents a step, and a numeral following the ST represents a step number. In FIGS. 7A and 7B, the process according to the exemplary embodiment will be mainly described, but description concerning general process such as setting operation by a user, detailed control of the temperature of the discharging hot water will be omitted. Moreover, the process of the main routine (ST30 to ST32) in FIG. 7A is the same as the process of the main routine (ST1 to ST3) which has been described in FIG. 5A, and will not be described here. Only the objective SC value correcting routine in FIG. 7B will be described below.

As shown in FIG. 7B, in parallel with the main routine in FIG. 7A, the control means 10 inputs the temperature of the refrigerant just before the first expansion valve 4, from the refrigerant temperature sensor 23, and the outdoor air temperature from the outdoor air temperature sensor 21 (ST40). Then, the discharging pressure of the compressor 1 (condensing pressure) from the pressure sensor 30 is inputted (ST41). Then, the current rotation number of the compressor 1 is extracted (ST42). The control means 10 also controls the compressor 1 so that the current rotation number may reach the objective rotation number, and therefore, stores the current rotation number too. Herein, this rotation number is extracted.

Then, a rise or a drop of the rotation number of the compressor 1 and the condensing pressure is determined (ST43). The control means 10 determines the each value depending on whether the values of the pressure sensor 30 and the rotation number of the compressor 1 which have been taken periodically at a plurality of times become larger or become smaller in time series, as described above. Then, the control means 10 determines whether or not the outdoor air temperature is lower than the determined temperature (10° C., for example) (ST44).

If the outdoor air temperature is lower than the determined temperature (ST44: Yes), the control means 10 extracts the pulse number to be outputted from the second expansion valve pulse number table which has been described in FIG. 3, using respective parameters of the condensing pressure, the rotation number of the compressor 1 and the rise or drop of the condensing pressure and the rotation number of the compressor 1 which have been obtained in ST41 to ST43 (ST45).

Then, the control means 10 determines whether or not the pulse number extracted in ST 45 is either of L1 to L4 (ST46). If the extracted pulse number is either of L1 to L4 (ST46:Yes), the control means 10 outputs the control signal having the pulse number of L1 to L4 to the second expansion valve 15 thereby to open the second expansion valve 15, to turn the injection ON (ST47).

Then, the control means 10 extracts the corrected objective SC values from the corrected objective SC value (Tc) table as described in FIG. 6, using the respective parameters of the condensing pressure, the rotation number of the compressor 1, and the rise or drop of the condensing pressure and the rotation number of the compressor 1 which have been obtained in ST41 to ST43 (ST48).

Then, the current supercooling degree is calculated from the refrigerant temperature which has been detected in ST40, and the condensing temperature calculated from the discharging pressure which has been detected in ST41 (ST49). Thereafter, the opening degree of the first expansion valve 4 is minutely adjusted according to a difference between the corrected objective SC value which has been extracted in ST48 and the current supercooling degree which has been calculated in ST49 (ST50).

Specifically, the corrected objective SC value is deducted from the current supercooling degree, and the first expansion valve 4 is controlled to be opened, when the result of the deduction is plus, and controlled to be closed, when the result of the deduction is minus. Then, this process is returned to the step in the main routine as shown in FIG. 7A, in which intrusion of the objective SC value correcting routine has occurred.

In case where the outdoor air temperature is not lower than the determined temperature (ST44:No), and in case where L1 to L4 are not extracted (OFF is extracted) in ST46 (ST46:No), the control means 10 extracts the objective SC value from the objective SC value (T) table as described in FIG. 2, using the respective parameters of the condensing pressure, the rotation number of the compressor 1, and the rise or drop of the condensing pressure and the rotation number of the compressor 1 which have been obtained in ST41 to ST43 (ST51), and jumps to ST49.

As described above, according to the exemplary embodiments of the invention, in case where the liquid refrigerant is injected in operating the heat pump apparatus 10, when the outdoor air temperature is low, and the discharging hot water at high temperature is required, the objective SC value at the time when the liquid refrigerant is not injected is corrected by a determined value, thereby to control the operation. As the results, high heating ability is exerted, and the operation can be continued at high coefficient of performance, irrespective of whether or not the liquid refrigerant is injected.

While the present inventive concept has been shown and described with reference to certain exemplary embodiments thereof, it will be understood by those skilled in the art that various changes in form and details may be made therein without departing from the spirit and scope of the invention as defined by the appended claims.

What is claimed is:
1. A heat pump apparatus comprising:
 a refrigerant circuit which includes a compressor, a utilization-side heat exchanger, a first expansion valve, and an outdoor heat exchanger;
 an injection pipe which includes a solenoid switching valve and a second expansion valve; and
 an objective supercooling degree table which stores objective supercooling degrees which are determined by condensing pressure in the refrigerant circuit, whether the condensing pressure is rising or dropping from a predetermined threshold value of condensing pressure, and rotation number of the compressor,
 wherein liquid refrigerant is injected to the compressor by way of the injection pipe,
 wherein the heat pump apparatus switches between a first case where the liquid refrigerant is injected to the compressor and a second case where the liquid refrigerant is not injected,
 wherein, in the second case, the first expansion valve is controlled to be opened or closed so that an operation of the heat pump apparatus is continued at the objective supercooling degree which is extracted from the objective supercooling degree table, and
 wherein, in the first case, the objective supercooling degree is extracted from the objective supercooling degree table and corrected by a determined value, and the first expansion valve is controlled so that the operation of the heat pump apparatus is continued at the corrected supercooling degree.

2. The heat pump apparatus according to claim 1, wherein the respective supercooling degrees which are stored in the objective supercooling degree table are uniformly corrected by the determined value.

3. The heat pump apparatus according to claim 1, wherein the respective supercooling degrees which are stored in the objective supercooling degree table are corrected based on conditions for extracting the respective objective supercooling degrees.

4. The heat pump apparatus to claim 3, wherein the conditions are threshold value of the condensing pressure in the refrigerant circuit and the rotation number of the compressor.

5. The heat pump apparatus according to claim 1, wherein the predetermined threshold value assigned when the condensing pressure is rising and the predetermined threshold value assigned when the condensing pressure is dropping are different from each other.

6. The heat pump apparatus according to claim 1, wherein the predetermined threshold value assigned when the condensing pressure is rising is greater than the predetermined threshold value assigned when the condensing pressure is dropping.

7. The heat pump apparatus according to claim 1, further comprising:
a controller configured to control the heat pump apparatus, wherein the objective supercooling degree table is stored in the controller.

8. A heat pump apparatus comprising:
a refrigerant circuit which includes a compressor, a utilization-side heat exchanger, a first expansion valve, and an outdoor heat exchanger;
an injection pipe which includes a solenoid switching valve and a second expansion valve;
an objective supercooling degree table which stores objective supercooling degrees which are determined by condensing pressure in the refrigerant circuit, whether the condensing pressure is rising or dropping from a predetermined threshold value of condensing pressure, and rotation number of the compressor; and
a corrected objective supercooling degree table which stores supercooling degrees which have been obtained, by uniformly correcting by a determined value the respective supercooling degrees stored in the objective supercooling degree table,
wherein liquid refrigerant is injected to the compressor by way of the injection pipe,
wherein the heat pump apparatus switches between a first case where the liquid refrigerant is injected to the compressor, and a second case where the liquid refrigerant is not injected,
wherein, in the second case, the first expansion valve is controlled to be opened or closed so that an operation of the heat pump apparatus is continued at the objective supercooling degree which is extracted from the objective supercooling degree table, and
wherein, in the first case, the first expansion valve is controlled so that the operation of the heat pump apparatus is continued at the supercooling degree which is extracted from the corrected objective supercooling degree table.

9. The heat pump apparatus according to claim 8, wherein the predetermined threshold value assigned when the condensing pressure is rising and the predetermined threshold value assigned when the condensing pressure is dropping are different from each other.

10. A heat pump apparatus comprising:
a refrigerant circuit which includes a compressor, a utilization-side heat exchanger, a first expansion valve, and an outdoor heat exchanger;
an injection pipe which includes a solenoid switching valve and a second expansion valve;
an objective supercooling degree table which stores objective supercooling degrees which are determined by condensing pressure in the refrigerant circuit, whether the condensing pressure is rising or dropping from a predetermined threshold value of condensing pressure, and rotation number of the compressor; and
a corrected objective supercooling degree table which stores supercooling degrees which have been obtained, by separately correcting by a determined value the respective supercooling degrees stored in the objective supercooling degree table based on conditions for extracting the respective objective supercooling degrees,
wherein liquid refrigerant is injected to the compressor by way of the injection pipe,
wherein the heat pump apparatus switches between a first case where the liquid refrigerant is injected to the compressor, and a second case where the liquid refrigerant is not injected,
wherein, in the second case, the first expansion valve is controlled to be opened or closed so that an operation of the heat pump apparatus is continued at the objective supercooling degree which is extracted from the objective supercooling degree table, and
wherein, in the first case, the first expansion valve is controlled so that the operation of the heat pump apparatus is continued at the supercooling degree which is extracted from the corrected objective supercooling degree table.

11. The heat pump apparatus according to claim 10, wherein the predetermined threshold value assigned when the condensing pressure is rising and the predetermined threshold value assigned when the condensing pressure is dropping are different from each other.

12. The heat pump apparatus according to claim 10, wherein the conditions are threshold value of the condensing pressure in the refrigerant circuit and the rotation number of the compressor.

* * * * *